(12) United States Patent
Tabata et al.

(10) Patent No.: US 6,317,665 B1
(45) Date of Patent: *Nov. 13, 2001

(54) VEHICLE CONTROL SYSTEM

(75) Inventors: Atsushi Tabata, Okazaki; Yutaka Taga, Aichi-gun; Ryuji Ibaraki, Toyota, all of (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/420,342

(22) Filed: Oct. 19, 1999

(30) Foreign Application Priority Data

Oct. 21, 1998 (JP) ................................... 10-299984

(51) Int. Cl.⁷ ..................................................... B60K 1/02
(52) U.S. Cl. ................................ 701/22; 701/67; 701/68; 180/65.2
(58) Field of Search .................................. 180/165, 65.2, 180/65.3, 65.4; 477/2, 3, 5, 6, 8; 701/22, 67, 68

(56) References Cited

U.S. PATENT DOCUMENTS

| 5,562,565 | * | 10/1996 | Moroto et al. | 477/3 |
| 5,944,630 | * | 8/1999 | Omote | 477/5 |
| 6,070,680 | * | 6/2000 | Ogama | 180/65.2 |
| 6,183,389 | * | 2/2001 | Tabata | 477/5 |

FOREIGN PATENT DOCUMENTS 8-168104   6/1996   (JP) .

* cited by examiner

Primary Examiner—Richard M. Camby
(74) Attorney, Agent, or Firm—Oliff & Berridge, PLC

(57) ABSTRACT

In a vehicle provided with a transmission that has a lock-up clutch that is directly couplable between drive sources and a drive shaft, the shock of switching between the drive sources is prevented from being transmitted. It is determined whether the drive source is to be switched, and when "YES" is determined, a lock-up clutch is disengaged or placed in a half-engaged state, and the shock due to switching of the drive source is prevented from being transmitted. Then, after it is confirmed that switching of the drive source is completed, the lock-up clutch is once again placed in the fully-engaged state.

32 Claims, 11 Drawing Sheets

| | C0 | C1 | C2 | B0 | B1 | B2 | B3 | B4 | F0 | F1 | F2 |
|---|---|---|---|---|---|---|---|---|---|---|---|
| P | ○ | | | | | | | | | | |
| R (STOPPED) | ○ | | ○ | | | | | ○ | ○ | | |
| R (RUNNING) | | | ○ | | | | | ○ | ○ | | |
| N | ○ | | | | | | | | | | |
| D 1st | ○ | ○ | | | | | | | ○ | | ○ |
| D 2nd | ⊚ | ○ | | | | | | | ○ | ○ | |
| D 3rd | ○ | ○ | | | | | ○ | | ○ | | |
| D 4th | ○ | ○ | ○ | | | ○ | | | ○ | | |
| D 5th | | ○ | ○ | ○ | | ○ | | | | | |
| L 1st | | ○ | | | ⊚ | | | | ○ | | |
| 2 2nd | ⊚ | ○ | | | | | | | ○ | ○ | |
| 3 3rd | ○ | ○ | | | | | ○ | | ○ | | |
| 4 4th | ○ | ○ | ○ | | | △ | | | ○ | | |
| D 5th | | ○ | ○ | ○ | | △ | | ⊚ | | | |

○ ENGAGED    ⊚ ENGAGED AT THE TIME OF ENGINE BRAKING    △ ENGAGED BUT IRRELEVANT TO DRIVING FORCE TRANSMISSION

VEHICLE CONTROL SYSTEM

BACKGROUND OF THE INVENTION

1. Field of Invention

This invention relates to a control system for a vehicle in which a fuel combustion-driven engine and a motor/generator are provided as interchangeable drive sources, and in which a transmission with a lock-up clutch is provided which is directly couplable between the drive sources and a drive wheel.

2. Description of Related Art

In a vehicle that has an engine, fuel is combusted within the engine, generating heat energy, and this heat energy is converted to mechanical energy (drive force) to drive the vehicle. With an engine, the driving region at which combustion efficiency is good and high torque can be obtained is limited to a relatively narrow r.p.m. range. Therefore, in a vehicle that uses an engine as the drive source, the engine r.p.m. and engine torque are changed by a transmission depending on a driving condition, and transmitted to the vehicle wheel(s).

Incidentally, in recent years, so-called hybrid vehicles have been proposed that have a different type of drive source, with objects of conserving the fuel which drives the engine, reducing the noise due to engine revolution, and reducing the exhaust gas that is generated through combustion of the fuel.

In these hybrid vehicles, too, a transmission is provided between the drive source and the drive wheel(s), but it is widely proposed to use a transmission with a torque converter, the same as is used in normal vehicles.

Additionally, there are many proposals to use a torque converter that is equipped with a directly couplable lock-up clutch, because the transmission efficiency in a conventional torque converter declines because fluid transmission is performed. For example, a hybrid vehicle disclosed in Japanese Laid-Open application 8-168104 also has a torque converter with a lock-up clutch as described above.

SUMMARY OF THE INVENTION

Incidentally, hybrid vehicles were developed with primary objects of reducing fuel consumption and reducing exhaust emissions, and require the driving be done as much as possible with the lock-up clutch engaged. However, if the drive source is switched while the lock-up clutch is engaged, the torque change that occurs at starting and/or stopping of the engine is transmitted to the gear mechanism of an automatic transmission as a shock, and this shock is transmitted to the vehicle body.

Therefore, it is attempted to prevent, as much as possible, the transmission of the shock of switching the drive source while the lock-up clutch is engaged. However, in the above-described vehicle, when the lock-up clutch is engaged and the vehicle is, driven by the drive force of the engine, a rotary force is applied by a motor/generator to negate the vibration of the engine in order to control the vibration of the engine that is generated, especially during deceleration. This does not solve the above-mentioned problems.

This invention was made in the above-described background, and has an object of preventing transmission of the shock of switching drive sources in a vehicle having a fuel combustion-driven engine and a motor/generator drive source provided as interchangeable drive sources, and in which a transmission with a lock-up clutch is provided which is directly couplable between the drive sources and a drive wheel.

A first aspect of the invention provides a control system for a vehicle in which a fuel combustion-driven engine and a motor/generator are provided as interchangeable drive sources, and in which a transmission with a lock-up clutch is provided which is directly couplable between the drive sources and a drive wheel, wherein, when the drive source is switched between the engine and the motor/generator, the engaged lock-up clutch is temporarily placed in a disengaged state or a half-engaged state.

With a control system thus structured, when the vehicle drive source is switched between the engine and the motor/generator, the engaged lock-up clutch is temporarily placed in a disengaged state or a half-engaged state.

A second aspect of the invention provides a control system for a vehicle in which a fuel combustion-driven engine and a motor/generator are provided as interchangeable drive sources, and in which a transmission with a lock-up clutch is provided which is directly couplable between the drive sources and a drive wheel, wherein, when the drive source is switched from the motor/generator to the engine while the vehicle is stopped, switching is performed after disengaging the lock-up clutch.

In a control system thus configured, when the drive source is switched from the motor/generator to the engine while the vehicle is stopped, switching is performed after the lock-up clutch is disengaged.

A third aspect of the invention provides a control system for a vehicle in which a fuel combustion-driven engine and a motor/generator are provided as interchangeable drive sources, and in which a transmission with a lock-up clutch is provided which is directly couplable between the drive sources and a drive wheel, wherein, when the drive source is switched from the engine to the motor/generator while the vehicle is stopped, switching is performed after the lock-up clutch is disengaged.

With a control system thus configured, when the drive source is switched from the engine to the motor/generator while the vehicle is stopped, switching is performed after the lock-up clutch is disengaged.

DETAILED DESCRIPTION OF PREFERRED EMBODIMENTS

Figure 2:
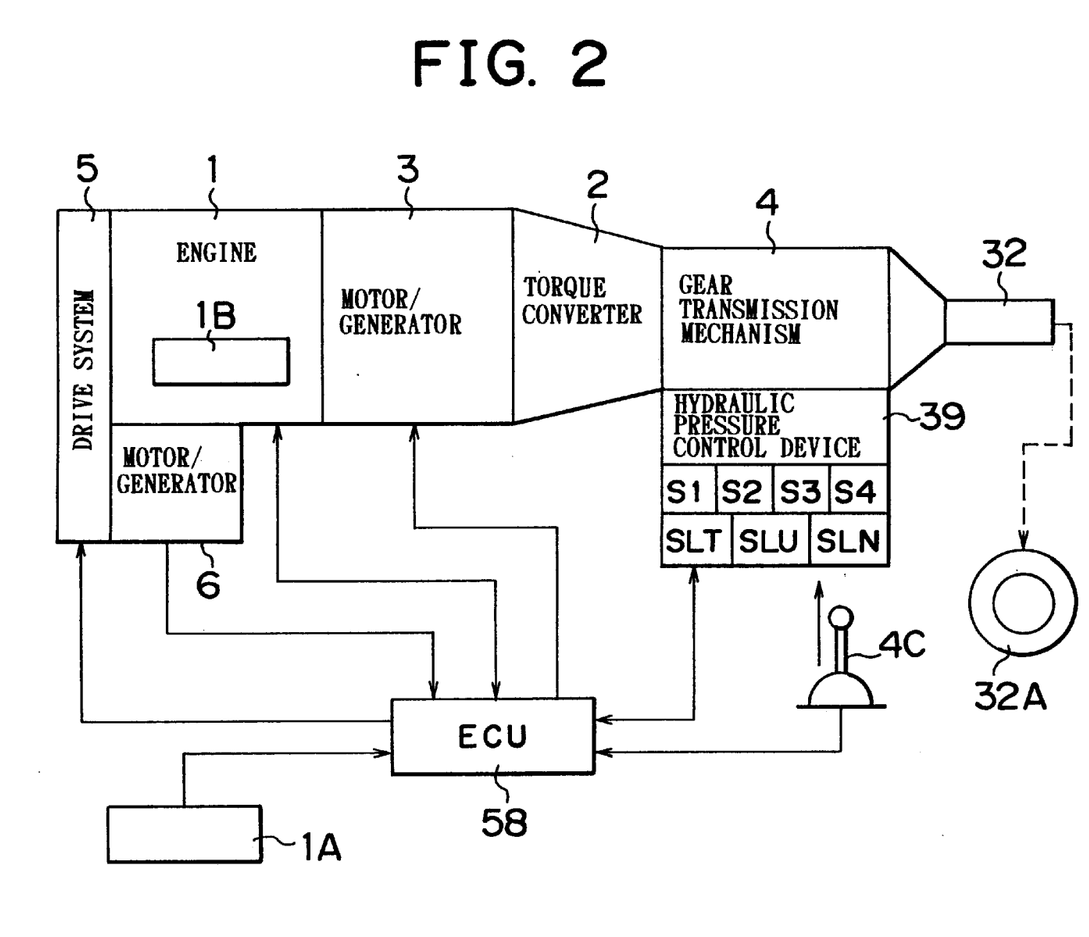
FIG. 2 is a block diagram that shows a system structure of a hybrid vehicle that uses this invention.

Next, this invention will be more specifically described with reference to the drawings. FIG. 2 is a block diagram that shows the system structure of a hybrid vehicle in which this invention is applied. For the engine 1, which is a drive source of the vehicle, an internal combustion engine is used, such as a gasoline engine, a diesel engine, an LPG engine, a gas turbine engine or the like. The engine 1 of this embodiment has a conventional structure with a fuel injection system, an intake and exhaust system, an ignition system and/or the like.

Additionally, an electronic throttle valve 1B is provided in an air intake port of the engine 1, and the structure is such that the degree of opening of the electronic throttle valve 1B is electrically controlled. A torque converter 2, a motor/generator 3 and a gear transmission mechanism 4 provided on one path of transmission of the torque that is output by the engine 1. Specifically, the motor/generator 3 is positioned between the engine 1 and the torque converter 2, and the torque converter 2 is connected to the input side of the gear transmission mechanism 4. In other words, the engine 1, the motor/generator 3, the torque converter 2 and the gear transmission mechanism 4 are arranged in line. Furthermore, another motor/generator 6 is disposed on another path of transmission of the torque that is output by the engine 1, via a drive system 5. The motor/generators 3 and 6 may, for example, be AC synchronized motor/generators.

Figure 3:
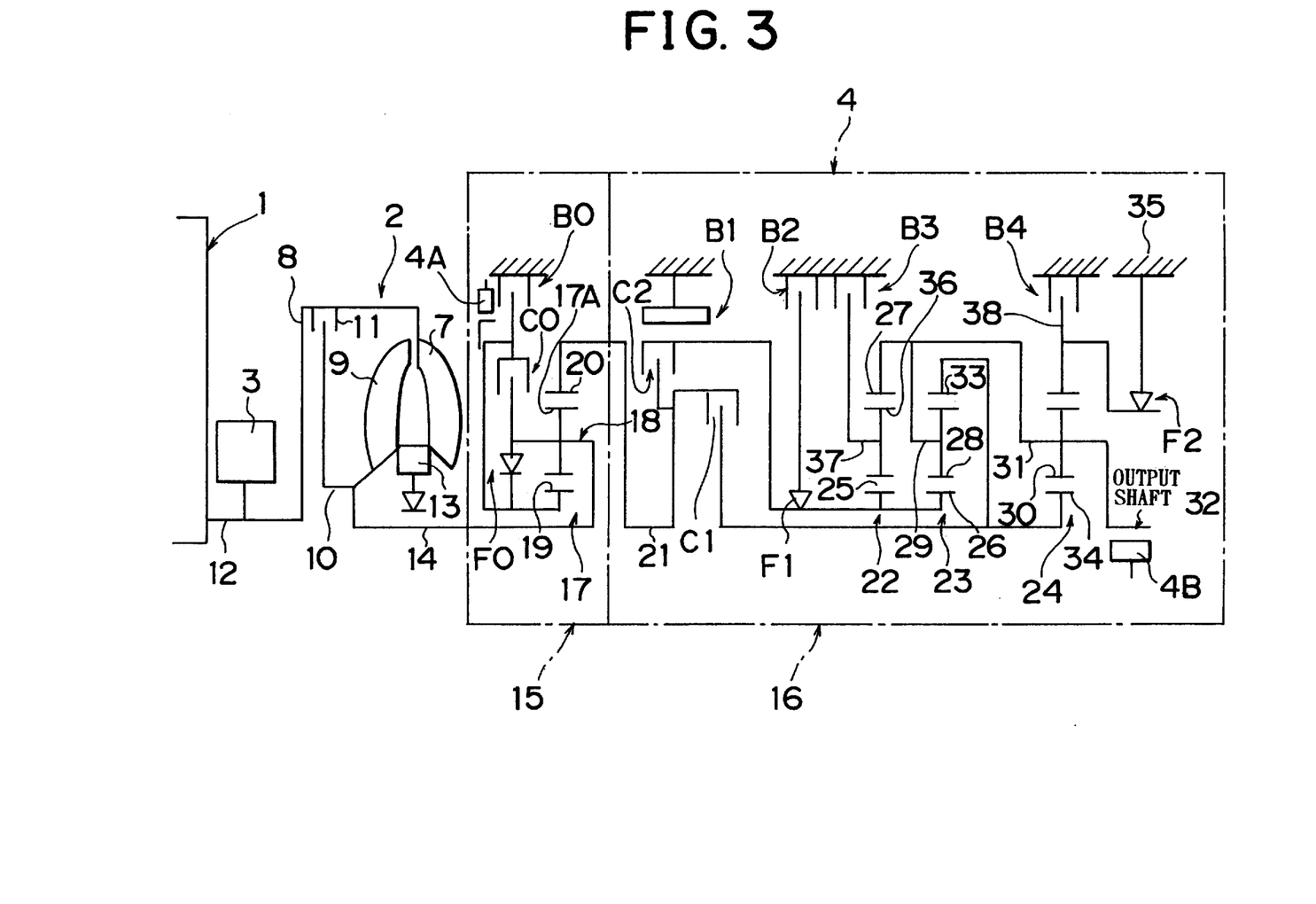
FIG. 3 is a skeleton diagram that shows a structure of the gear transmission mechanism and torque converter shown in FIG. 2.

First, the structure on one torque transmission path will be described in detail. FIG. 3 is a skeleton diagram of the structure of the torque converter 2 and the gear transmission mechanism 4. Automatic transmission fluid is used as operating fluid, and is poured into the casing that houses the torque converter 2 and the gear transmission mechanism 4.

The torque converter 2 transmits the torque of the drive side component to the receiving side component via a fluid medium. This torque converter 2 has a front cover 8 that is made integral with a pump impeller 7, a hub 10 integrally attached to a turbine runner 9, an a lock-up clutch 11. The torque of the pump impeller 7 is transmitted to the turbine runner 9 by a fluid medium. The lock-up clutch 11 is for selectively engaging/disengaging the front cover 8 and the hub 10. Furthermore, it is also possible to perform slip control that causes the lock-up clutch 11 to slip at a specified engaging pressure.

The front cover 8 is coupled to a crank shaft 12 of the engine 1. A rotor (not shown) of the motor/generator 3 is connected to the outer periphery of the crank shaft 12. Additionally, a stator 13 is provided at the inner peripheral side of the pump impeller 7 and the turbine runner 9. This stator 13 is for amplifying the torque that is transmitted from the pump impeller 7 to the turbine runner 9. Furthermore, an input shaft 14 is connected to the hub 10. Therefore, when torque is output from the crank shaft 12 of the engine 1, this torque is transmitted to the input shaft 14 via the torque converter 2 or the lock-up clutch 11. Additionally, it is also possible to perform control that inputs the torque of the engine 1 to the motor/generator 3, and to perform control that transmits the torque of the motor/generator 3 to the crank shaft 12.

The above-mentioned gear transmission mechanism 4 is constituted by a secondary transmission component 15 and a primary transmission component 16. The secondary transmission component 15 is provided with a planetary gear mechanism 17 for an overdrive. An input shaft 14 is coupled to a carrier 18 of the planetary gear mechanism 17. A multi-plate clutch CO and a one-way clutch FO are provided between the carrier 18 and the sun gear 19 that form the planetary gear mechanism 17. The one-way clutch FO engages upon positive rotation of the sun gear 19 relative to the carrier 18, or in other words, when the sun gear 19 rotates in the direction of rotation of the input shaft 14. A ring gear 20, which is an output element of the secondary transmission component 15, is connected to an intermediate shaft 21, which is an input element of the primary transmission component 16. Additionally, a multi-plate brake BO is provided that selectively stops the rotation of the sun gear 19.

Therefore, in the secondary transmission component 15, when the multi-plate clutch CO or the one-way clutch FO is engaged, the planetary gear mechanism 17 rotates as a single unit. Therefore, the intermediate shaft 21 rotates at the same speed as the input shaft 14, resulting in a low speed level. When the brake BO is engaged and the rotation of the sun gear 19 is stopped, the ring gear 20 is rotated at an amplified speed with respect to the input shaft 14, resulting in a high speed level.

Meanwhile, the primary transmission component 16 is provided with three planetary gear mechanisms 22, 23 and 24. The rotary elements that form the three planetary gear 22, 23 and 24 are coupled as described below. Namely, a sun gear 25 of the first planetary gear mechanism 22 and a sun gear 26 of the second planetary gear mechanism 23 are integrally coupled together. Additionally, a ring gear 27 of the first planetary gear mechanism 22, a carrier 29 of the second planetary gear mechanism 23, and a carrier 31 of the third planetary gear mechanism 24 are coupled together. Furthermore, an output shaft 32 is coupled to the carrier 31. This output shaft 32 is connected to a vehicle wheel 32A via a torque transmission system (not shown). Furthermore, a ring gear 33 of the second planetary gear mechanism 23 is coupled to a sun gear 34 of the third planetary gear mechanism 24.

In a gear train of the primary transmission component 16, one reverse speed and four forward speeds can be set. Frictional engaging systems, in other words a clutch and brake, for setting these speeds are provided as described below. First, the clutch will be described. A first clutch C1 is provided between the ring gear 33 and sun gear 34 on one side and the intermediate shaft 21 on the other side. Additionally, a second clutch C2 is provided between the mutually coupled sun gear 25 and sun gear 26 on one side and the intermediate shaft 21 on the other side.

Next, the brake will be described. A first brake B1 is a band brake, and is disposed so as to stop rotation of the sun gear 25 of the first planetary gear mechanism 22 and the sun gear 26 of the second planetary gear mechanism 23. A first one-way clutch F1 and a second brake B2, which is a multi-plate brake, are disposed in line between the sun gears 25 and 26 and the casing 35. The first one-way clutch F1 engages upon reverse rotation of the sun gears 25 and 26, or in other words, when the sun gears 25 and 26 try to rotate in a direction opposite the direction of rotation of the input shaft 14.

Additionally, a third brake B3, which is a multi-plate brake, is provided between the carrier 37 of the first planetary gear mechanism 22 and casing 35. The third planetary gear mechanism 24 is provided with a ring gear 38. A fourth brake B4, which is a one-way brake, and a second one-way clutch F2 are provided as a brake that stops rotation of the ring gear 28. The fourth brake B4 and the second one-way clutch F2 are arranged in parallel between the casing 35 and the ring gear 38. The second one-way clutch F2 is structured so as to engage when the ring gear 38 tries to rotate in reverse. Furthermore, an input r.p.m. sensor (turbine r.p.m. sensor) 4A that detects the input r.p.m. of the gear transmission mechanism 4 is provided, as well as an output r.p.m. sensor (vehicle speed sensor) 4B that detects the r.p.m of the output shaft 32 of the gear transmission mechanism 4.

Figure 4:
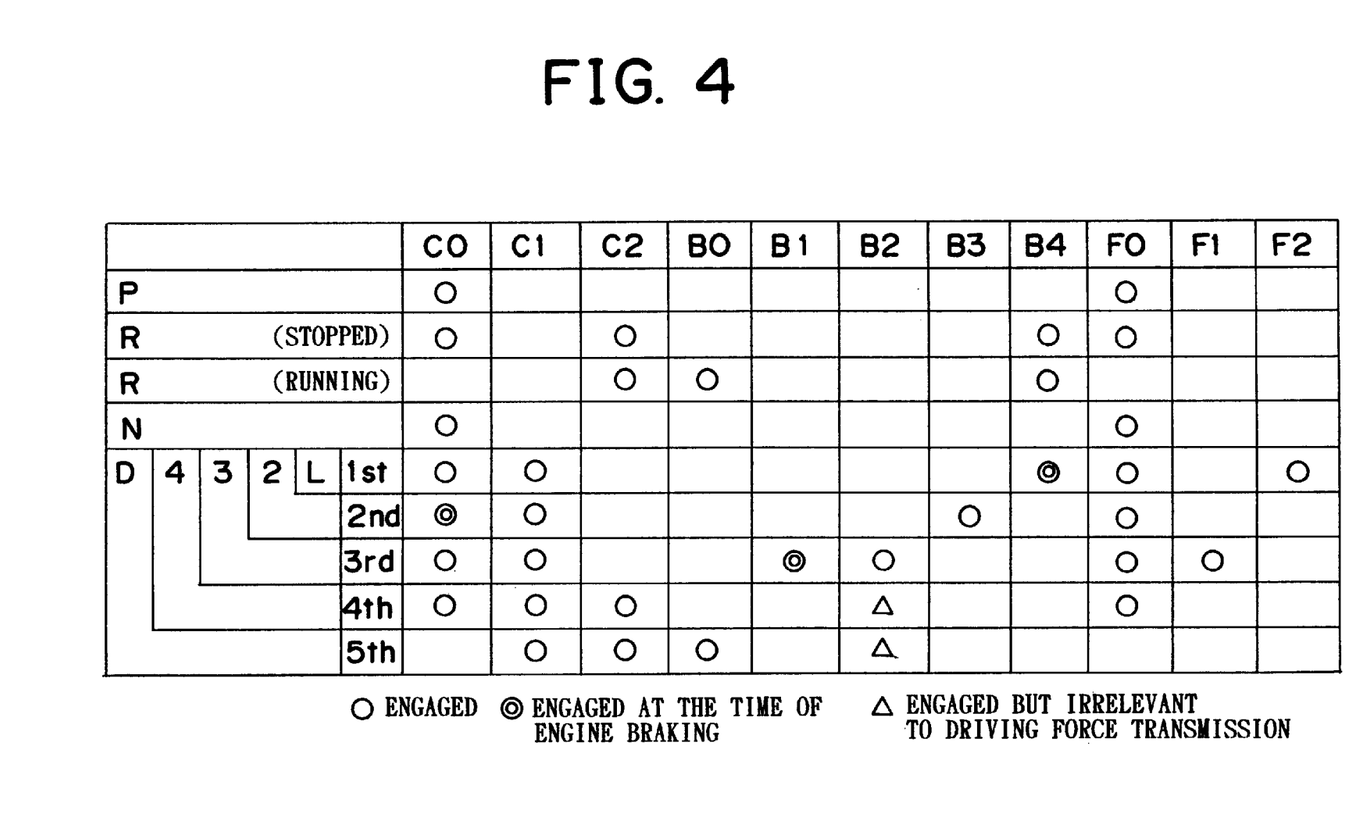
FIG. 4 is a chart that shows operating states of a frictional engaging system for setting various transmission speeds in the gear transmission mechanism shown in FIG. 3.

In the gear transmission mechanism 4 structured as described above, five forward speeds and one reverse speed can be set by engaging/disengaging the frictional engaging system of each clutch and brake as shown in the operation table of FIG. 4. In FIG. 4, a "○" shows that the frictional engaging system is engaged, and "⊙" shows that the frictional engaging system is engaged at the time of engine braking, and a "Δ" shows that the frictional engaging system may either be engaged or disengaged, or in other words, that even if the frictional engaging system is engaged, it is unrelated to transmission of torque. An empty box shows that the frictional engaging system is disengaged.

Figure 5:
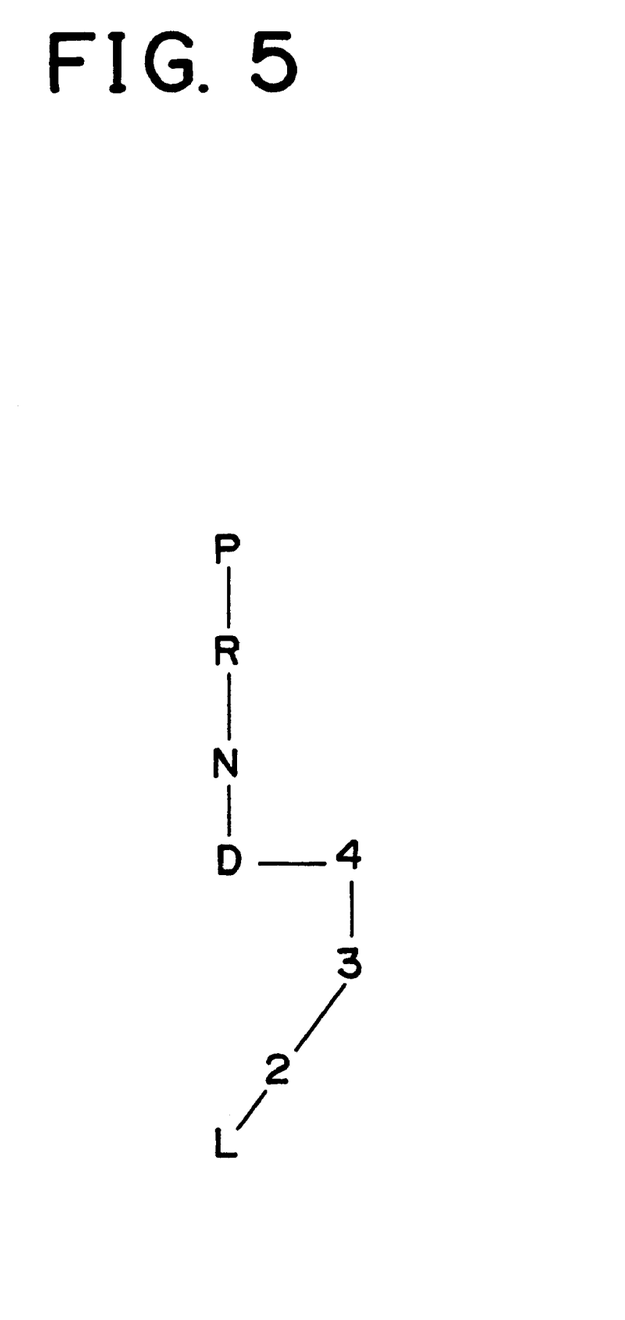
FIG. 5 is a diagram that shows shift positions of a shift lever that manually operates the gear transmission mechanism shown in FIG. 2.

Additionally, in this embodiment, through manual operation of a shift lever 4C, various shift lever positions can be set as shown in FIG. 5. Namely, a P (parking) position, an R (reverse) position, an N (neutral) position, a D (drive) position, a 4 position, a 3 position, a 2 position, and an L (low) position can be set. The D position, the 4 position, the 3 position, the 2 position and the L position are forward positions. When the D position, the 4 position, the 3 position and the 2 position are set, it is possible to change between a plurality of speeds. In contrast, when the L position, or the R position, which is the reverse position, is set, a single speed is fixed.

Through a hydraulic control system 39, shown in FIG. 2, setting or switching control of the speeds in the gear transmission mechanism 4, engagement/disengage or slip control of the lock-up clutch 11, line pressure control of the hydraulic circuit, control of the engagement pressure and the frictional engaging system(s), and/or the like are performed. The hydraulic control system 39 is electrically controlled, and is provided with first through third shift solenoid valves S1–S3 for executing speed changing of the gear transmission mechanism 4, and a fourth solenoid valve S4 for controlling an engine braking condition.

Furthermore, the hydraulic control system 39 is provided with a linear solenoid valve SLT for controlling line pressure of the hydraulic circuit, a linear solenoid valve SLN for controlling back pressure during speed transition of the gear transmission mechanism 4, and a linear solenoid valve SLU for controlling engagement pressure of the lock-up clutch 11 or a specified frictional engaging system.

Figure 6:
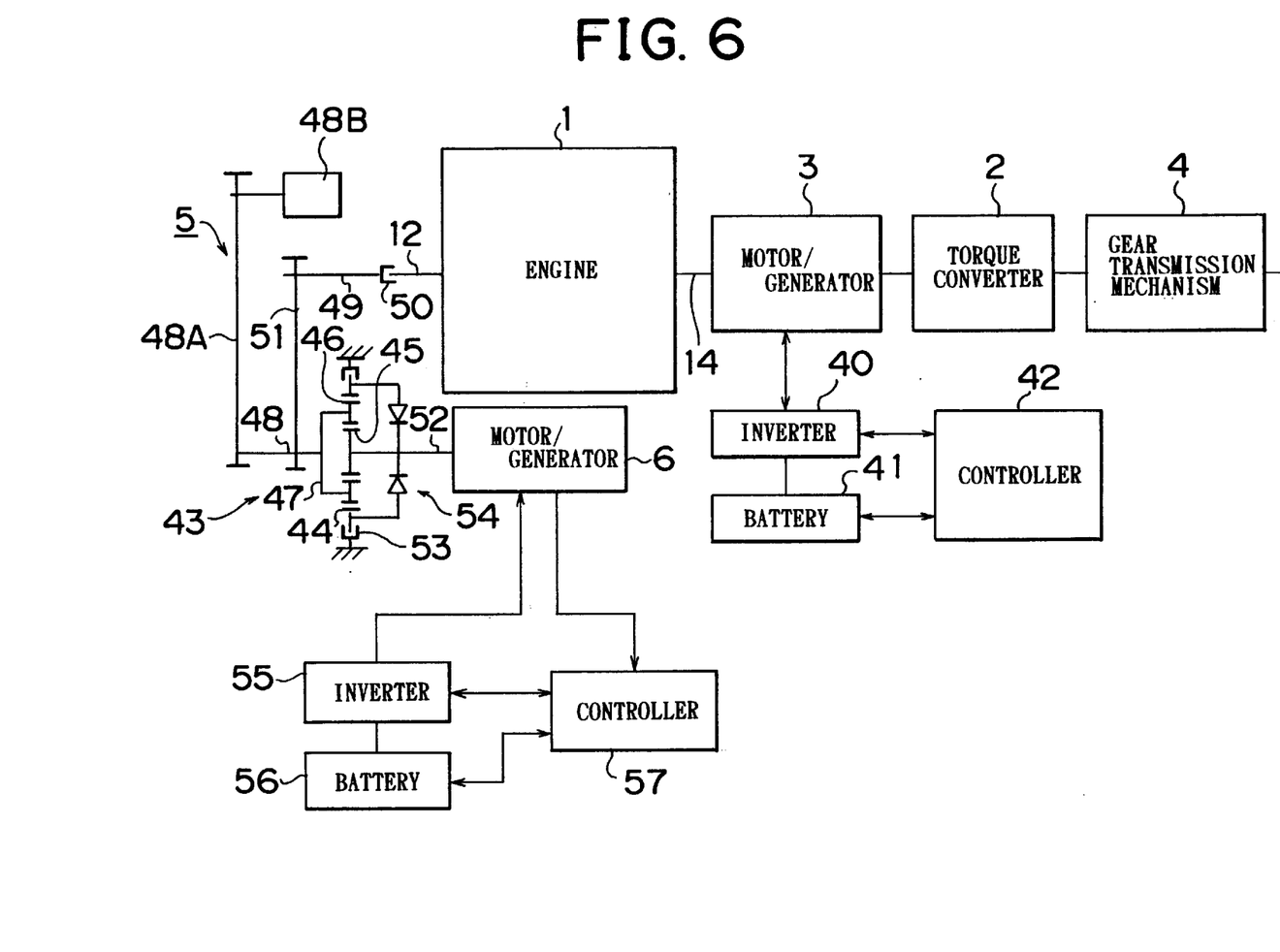
FIG. 6 is a block diagram that shows the relationship between the motor/generators 3 and 6 shown in FIG. 2 and other hardware structures.

FIG. 6 is a block diagram that shows the control system of the motor/generators 3 and 6. The motor/generator 3 is connected to the input shaft 14. The motor/generator 3 is provided with a rotation generating function that converts mechanical energy to electrical energy, and a function that converts electrical energy to mechanical energy. In other words, the motor/generator can function both as an electrical generator and as an electric motor.

In other words, the motor/generator 3 can generate electricity from the torque input from the crank shaft 12, and can store the electrical energy in a battery 41 via an inverter 40. Additionally, torque output from the motor/generator 3 can be transmitted to the crank shaft 12, and can supplement the torque output from the engine 1. Furthermore, a controller 42 is connected to the inverter 40 and the battery 41. This controller 42 has a function of detecting an electric current value provided to the motor/generator 3, and of detecting an electric current value generated by the motor/generator 3. Additionally, the controller 42 has a function of controlling the r.p.m of the motor/generator 3, a function of detecting and controlling a state of charge (SOC) of battery 41, and a function of detecting a failure state and/or temperature of the motor/generator 3.

Next, the operation of the motor/generator 6 will be described. The drive system 5 is provided with a speed reducing system 43. This speed reducing system 43 is connected to the engine 1 and to the motor/generator 6. The speed reducing system 43 is provided with a coaxially arranged ring gear 44 and sun gear 45, and a plurality of pinion gears 46 that mesh with the ring gear 44 and the sun gear 45. The plurality of pinion gears 46 are held by a carrier 47, and a rotary shaft 48 is coupled to the carrier 47. Additionally, a rotary shaft 49 is provided coaxially with the crank shaft 12 of the engine 1, and a clutch 50 is provided that connects/isolates the rotary shaft 49 and the crank shaft 12. A chain 51 is provided between the rotary shaft 49 and the rotary shaft 48 to relatively transmit torque. Furthermore, an auxiliary system 48B such as an air compressor or the like is connected to the rotary shaft 48 via a chain 48A.

Additionally, the motor/generator 6 is provided with a rotary shaft 52, and the above-mentioned sun gear 45 is attached to the rotary shaft 52. Additionally, a brake 53 is provided in the housing to stop rotation of the ring gear 44. Furthermore, a one-way clutch 54 is disposed at the periphery of the rotary shaft 52, and an inner shaft of the one-way clutch 54 is coupled to the rotary shaft 52. An outer shaft of the one-way clutch 54 is coupled to the ring gear 44. Through the speed reducing system 43 with the above-described structure, torque transmission or speed reduction is carried out between the engine 1 and the motor/generator 6. Furthermore, the one-way clutch 54 engages when torque output from the engine 1 is transmitted to the motor/generator 6.

The above-described motor/generator 6 is provided with a rotation generating function that converts mechanical energy to electrical energy, and with a force-exerting function that converts electrical energy to mechanical energy. In other words, the motor/generator 6 can function both as an electric generator and as an electric motor. Specifically, the motor/generator 6 has a function as a starter that starts the engine 1, a function as an alternator, and a function of driving an auxiliary system 48B when the engine 1 is stopped.

When the motor/generator 6 functions as a starter, the clutch 50 and the brake 53 are engaged, and the one-way clutch 54 is disengaged. When motor/generator 6 functions as an alternator, the clutch 50 and the one-way clutch 54 are engaged, and the brake 53 is disengaged. Furthermore, when the auxiliary system 48B is driven by the motor/generator 6, brake 53 is engaged, and the clutch 50 and the one-way clutch 54 are disengaged.

In other words, it is possible to input torque that has been output from the engine 1 to the motor/generator 6 and generate electricity, and to store this electrical energy in the battery 56 via an inverter 55. Additionally, it is possible to transmit torque output from the motor/generator 6 to the engine 1 or the auxiliary system 48B. Furthermore, a controller 57 is connected to the inverter 55 and the battery 56.

This controller 57 has a function of detecting and/or controlling an electric current value supplied by the motor/generator 6, and/or an electric current value generated by the motor/generator 6. Additionally, the controller 57 is provided with a function that controls the r.p.m of the motor/generator 6, and a function that detects and controls the state of charge (SOC) of the battery 56.

Figure 7:
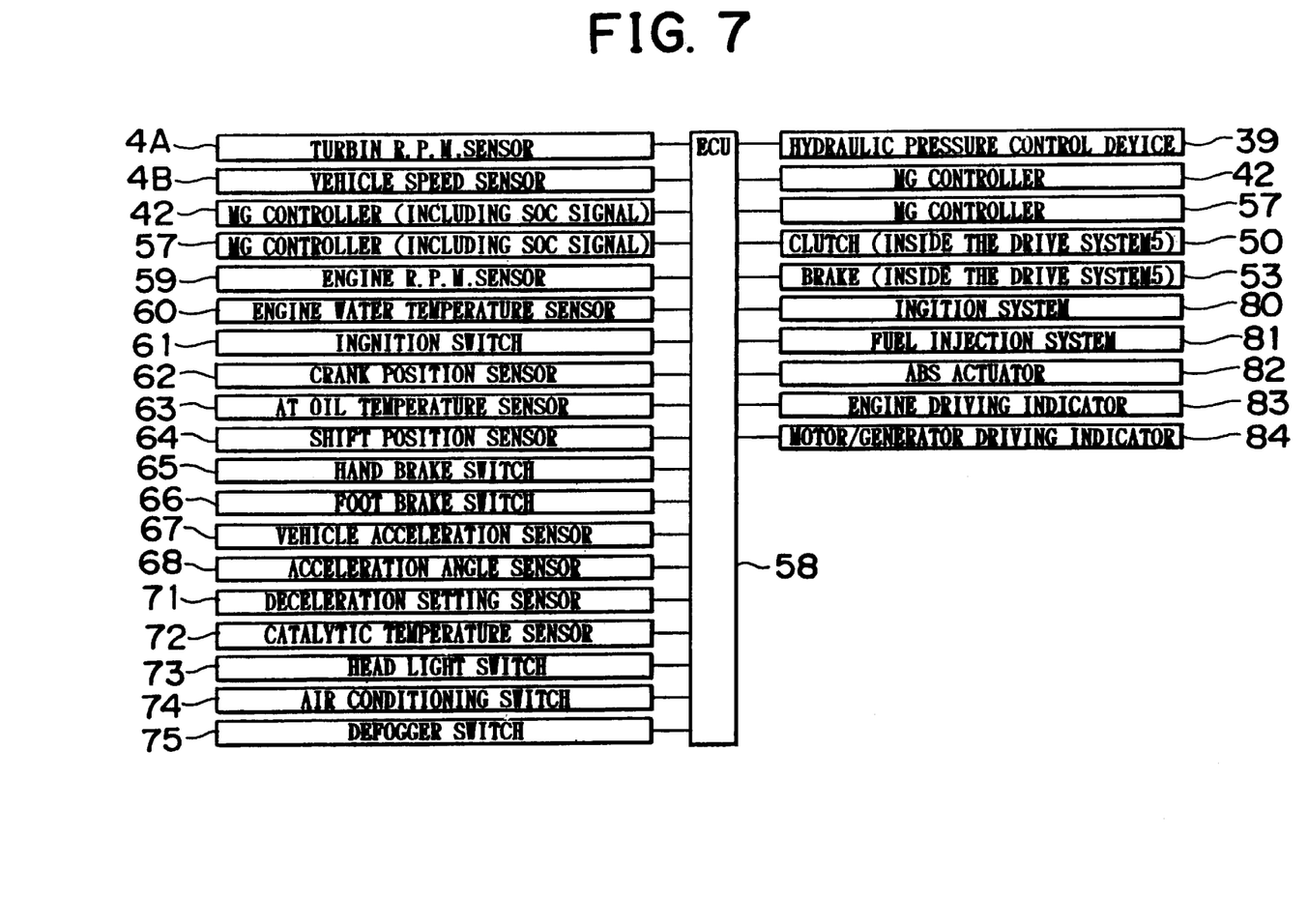
FIG. 7 is a diagram that shows signals that are input and output to/from an ECU 58.

FIG. 7 is a block diagram that shows a control circuit of the system shown in FIGS. 2 and 6. An electronic control unit (ECU) 58 is constituted by a microcomputer that has a central processing unit (CPU), a storage unit (RAM, ROM) and an input/output interface as main components.

The following signals and/or the like are input to the electronic control unit 58: a signal from the turbine r.p.m. sensor 4A of the torque converter 2, a signal from the vehicle speed sensor 4B, signals from MG controllers 42 and 57 that include signals that show the state of charge (SOC) of the batteries 41 and 56, a signal from an engine r.p.m. sensor 59, a signal from an engine water temperature sensor 60, a signal from a ignition switch 61, a signal from a crank position sensor 62 that detects a rotary position of the crank shaft 12, a signal from an oil temperature sensor 63 that detects the temperature of automatic transmission fluid, a signal from a shift position sensor 64 that detects the operating position of the shift lever 4C, a signal from a side brake switch 65 that detects an intention of the driver to stop the vehicle, a signal from a foot brake switch 66 that detects an intention of the driver to slow the vehicle or hold the speed of the vehicle, a signal from a vehicle acceleration sensor 67, a signal from an acceleration degree sensor 68 that shows the amount by which an accelerator pedal 1A is depressed, a signal from a deceleration setting switch 71, a signal from a catalytic temperature sensor 72 provided in an exhaust pipe (not shown), and signals from a headlight switch 73, an air conditioning switch 74, and a defogger switch 75 and/or the like.

The following signals are output from the electronic control unit 58: a signal that controls the hydraulic pressure control system 39 of the gear transmission mechanism 4 in the automatic transmission, signals that control MG controllers 42 and 57, signals that control the clutch 50 and the brake 53 of the drive system 5 of the motor/generator 6, a signal that controls an ignition system 80 of the engine 1, a signal that controls a fuel injection system 81 of the engine 1, a signal that controls ABS actuator 82 that stops the vehicle when the engine is automatically stopped, a control signal to an indicator 83 that shows that the engine 1 is running, a control signal to an indicator 84 that shows that the motor/generator 3 is running, and/or the like.

In this manner, based on the various signals input to the electronic control unit 58, the operation of the engine 1, the operation of the motor/generators 3 and 6 and the operation of the gear transmission mechanism 4 are controlled. Specifically, control of starting/stopping and/or output of the engine 1 is carried out based on the signal from the shift position sensor 64, the signal from the ignition switch 61, the signal from the acceleration degree sensor 68, the signal showing the amount of charging of the batteries 41 and 56 by the motor/generators 3 and 6, and/or the like.

The content of the control by the electronic control unit 58 of the gear transmission mechanism 4, the hydraulic pressure control system 39 and the lock-up clutch 11 will now be specifically described. An acceleration map that controls the acceleration ratio of the gear transmission mechanism 4 is stored in the electronic control unit 58. In this acceleration map, running condition of the vehicle, for example acceleration degree and vehicle speed, are taken as parameters, and acceleration points for up-shifting or down-shifting from a specified transmission speed to another transmission speed are set.

An acceleration evaluation is carried out based on this acceleration map, and when the acceleration evaluation is established, a control signal is output from the electronic control unit 58 and this control signal is input to the hydraulic pressure control system 39. As a result, a specified solenoid valve(s) is operated, the hydraulic pressure in a specified frictional engaging system is changed, engaging/disengaging of the frictional engaging system is carried out, and a change in speed is thereby implemented. Here, the engine torque is mapped using the degree of throttle opening and the engine r.p.m. as parameters, and this map is stored in the electronic control unit 58. The engaging/disengaging timing of the frictional engaging system that implements the speed change, and the hydraulic pressure used in the frictional engaging system, are controlled based on the engine torque. In this manner, a so-called multistage type automatic transmission is structured by the gear transmission mechanism 4 and the hydraulic pressure control system 39.

The above-described lock-up clutch 11 is controlled based on the acceleration degree, the vehicle speed, the transmission speed and/or the like. For this purpose, a lock-up clutch control map that controls the operation of the lock-up clutch 11 is stored in the electronic control unit 58. In this lock-up clutch control map, an engaging and/or disengaging area of the lock-up clutch 11, or an area of slip control (interim state), are set with the acceleration degree of vehicle speed as parameters. Additionally, when the shift lever 4C is set in the D position or the 4 position, and the gear transmission mechanism 4 is set at a specified high speed level, control is performed to engage the lock-up clutch 11 or to allow it to slip. Furthermore, when the speed of the gear transmission mechanism 4 is changed while the lock-up clutch 11 is engaged, control is also performed to disengage lock-up clutch 11 at the time of changing speed.

In addition to the general control described above, in connection with this invention, the lock-up clutch 11 is operated as described below at the time of switching the drive source.

The control content of the above-described hybrid vehicle will be briefly described. When the ignition switch 61 is turned to the start position, the torque of the motor/generator 6 is transmitted to the engine 1 via the drive system 5, and the engine 1 is started. When the engine water temperature reaches or exceeds a specified value, when it is unnecessary to drive the auxiliary system 48B, and when it is unnecessary to charge the batteries 41 and 56, the engine 1 is automatically stopped after a specified time period.

When the accelerator pedal 1A is depressed, the torque of the motor/generator 3 is transmitted to the gear transmission mechanism 4 via the torque converter 2, and the vehicle moves forward. Fuel injection is not performed in the area of low engine efficiency, such as at the starting of movement of the vehicle and at low running speeds, and the vehicle runs by just the output of the motor/generator 3. During normal running, the engine 1 is automatically started and the vehicle runs by the engine output. For high-load running, the vehicle runs by the output of the engine 1 and the output motor/generator 3.

The power necessary to run the vehicle is calculated based on the acceleration degree and the vehicle speed. The engine r.p.m. is calculated based on an optimum combustion curve that is pre-stored in the electronic control unit 58.

Furthermore, in addition to controlling the amount by which the electronic throttle valve 1B is opened, the r.p.m. of the motor/generator 3 is determined based on the speed changing ratio of the gear transmission mechanism 4, and the engine r.p.m. is controlled. Simultaneously, with respect to the necessary drive force, the torque that must be generated by the motor/generator 3 is calculated.

When decelerating or holding the speed of the vehicle, the torque input from the wheel 32A is transmitted to the crank shaft 12 via the gear transmission mechanism 4 and the torque converter 2. When this happens, the motor/generator 3 functions as an electric generator by the torque from the wheel, and the recovered electrical energy is stored in the battery 41. The batteries 41 and 56 are controlled so that their amount of charge falls within a specified range. When the amount of charge diminishes, the engine output is increased, and a portion of the engine output is transmitted to the motor/generator 3 or the motor/generator 6, causing it to generate electricity. When the vehicle stops, the engine 1 is automatically stopped.

When the hybrid vehicle is running, when a change in the engine torque occurs during changing of the speed of the gear transmission mechanism 4 or during slip control of the lock-up clutch 11, the torque of the motor/generator 3 is controlled according to this change of the engine torque.

Here, a corresponding relationship of the structure of this embodiment and the structure of this invention will be described. The torque converter 2 that has the lock-up clutch 11 corresponds to a fluid-type torque transmitting system of this invention, and the gear transmission mechanism 4 corresponds to a transmission of this invention. Additionally, the motor/generator 3 corresponds to a rotary mechanism of this invention.

Next, control content of a hybrid vehicle that has the above-described hardware structure will be described.

Figure 1:
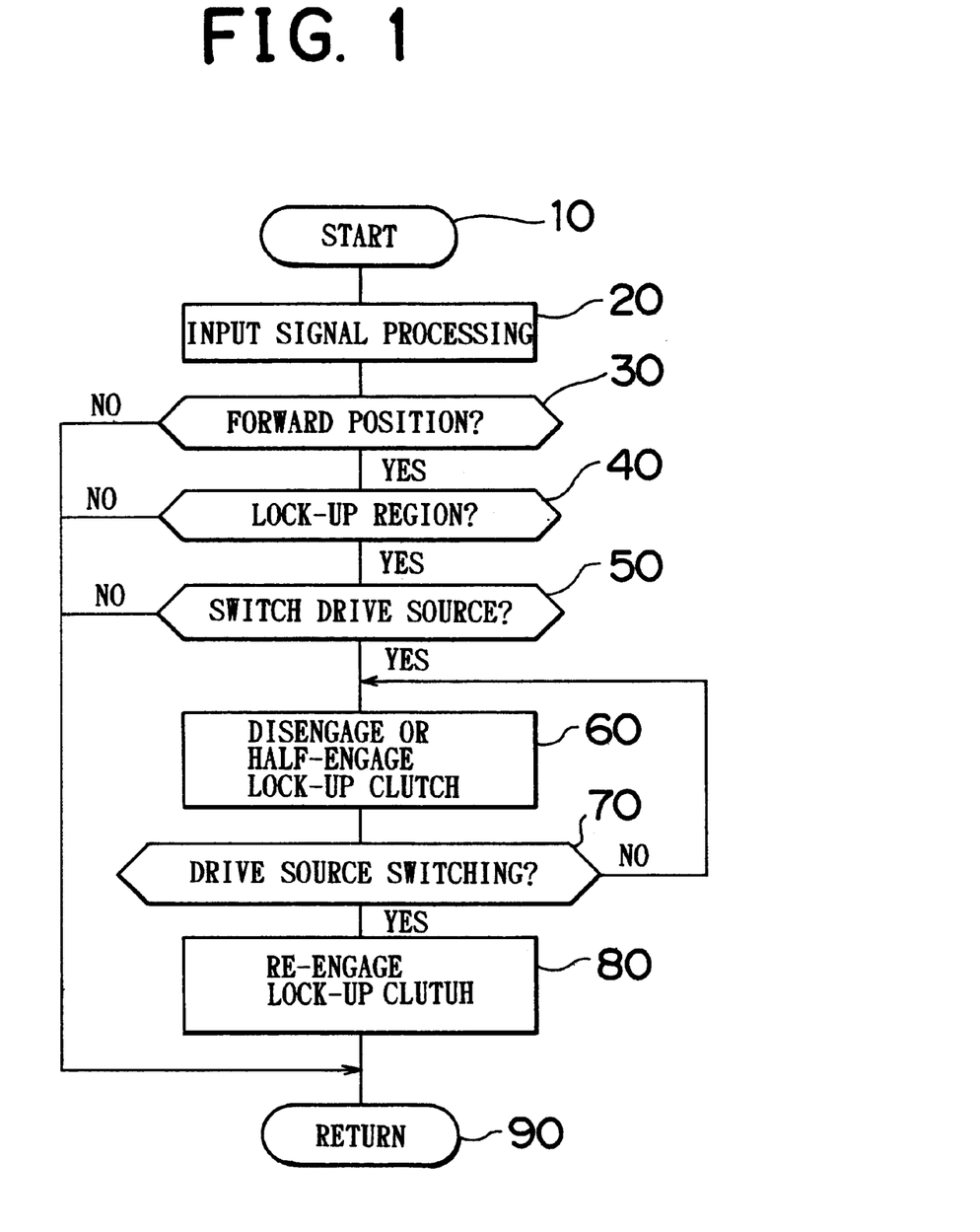
FIG. 1 is a flowchart of control in an embodiment of this invention.

FIG. 1 is a flowchart of the control corresponding to claim 1 of the invention. In the flowchart of FIG. 1, first, in step 20, input processing of various detection signals is carried out. Then, in step 30, it is determined whether the shift lever 4C is set at a forward position, in other words, at D, 4, 3, 2, or L.

When "NO" is determined in step 30, changing of the speed of the gear transmission mechanism (automatic transmission) is not performed while the vehicle is running, and no control of the lock-up clutch 11 is performed. Therefore, control jumps to step 90 and RETURNs.

If "YES" is determined in step 30, control proceeds to step 40 and determines whether lock-up is in progress. When "NO" is determined in step 40, in other words, when lock-up is not in progress, shock due to switching the drive source will not be a problem, and the main control is unnecessary, so control jumps to step 90 and RETURNs.

On the other hand, if "YES" is determined in step 40, control proceeds to step 50 and determines whether or not to switch the drive source. Switching of the drive source is implemented based on a running condition of the vehicle, the SOC of the battery 41, and/or the like.

When "NO" is determined in step 50, in other words, when switching of the drive source is not to be performed, shock will not be generated and this control is not necessary, so control jumps to step 90 and RETURNs. If "YES" is determined at step 50, in other words, if switching of the drive source is to be performed, the control of this invention will be performed. Control proceeds to step 60 places the lock-up clutch 11 in a disengaged state or a half-engaged state, and prevents the transmission of shock due to the changing of the drive source. Then, after is recognized that the drive source switching has been completed in step 70, control proceeds to step 80 and once again places the lock-up clutch 11 in the fully engaged state, and the procedure ends. If the vehicle is in a driving region that does not need lock-up when the procedure reaches step 80, the lock-up clutch 11 is left in the disengaged state.

Figure 8:
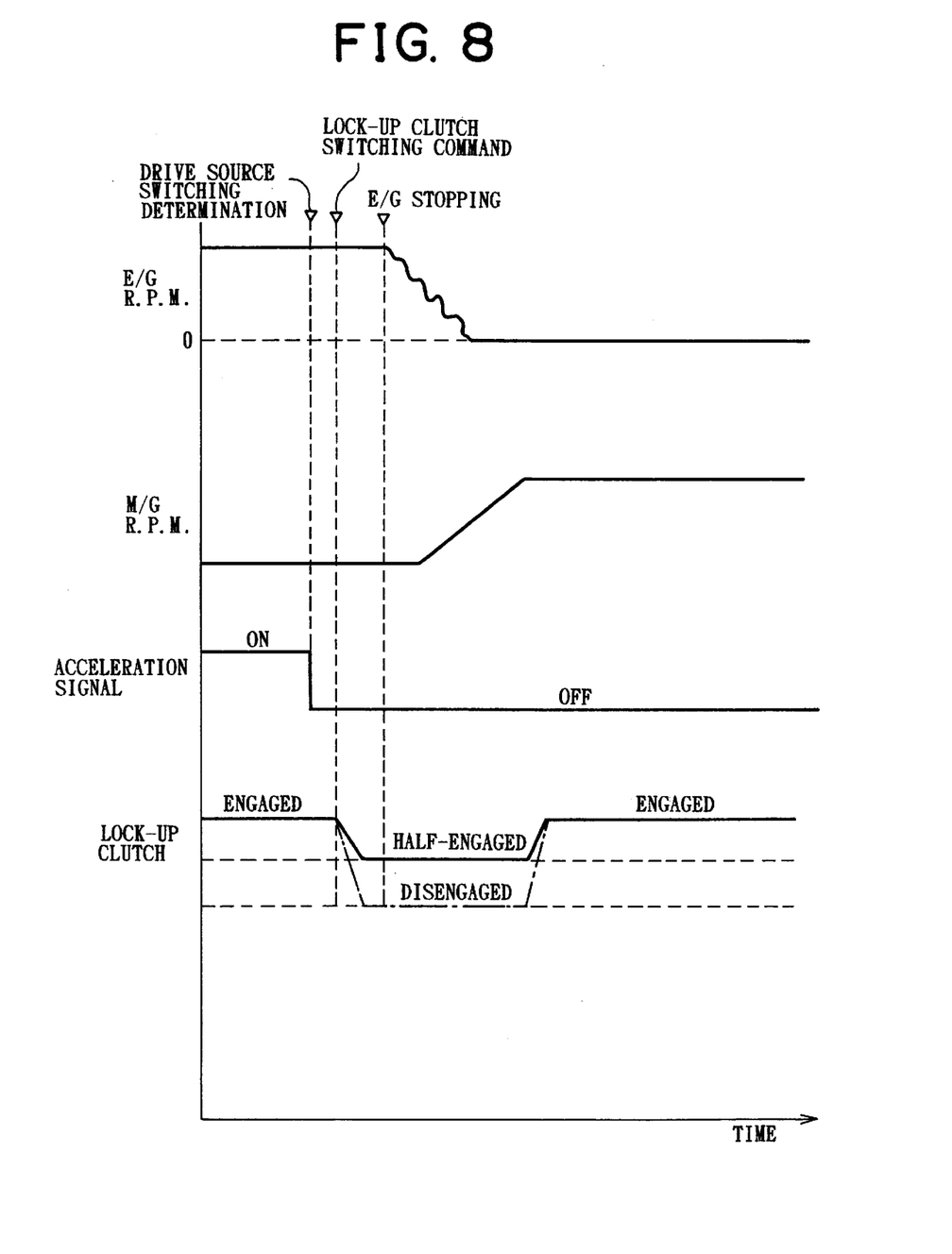
FIG. 8 is a timing chart that explains the control of FIG. 1.

FIG. 8 is a timing chart that shows an example of the above-described control. When an acceleration signal is placed in the OFF state, it is determined that drive source switching will be performed. Thereafter, a disengaged state or a half-engaged state of the lock-up clutch 11 commences, and after the lock-up clutch 11 is placed in the disengaged or half-engaged state, the engine 1 is stopped, the motor/generator 3 is started, and after switching of the drive source has been completed, the lock-up clutch 11 is re-engaged.

Through the above-described control, the drive source is switched from the engine 1 to the motor/generator 3, and shock due to vibration at the time of stopping the engine 1 is prevented from being transmitted beyond the torque converter 2.

Furthermore, when switching the drive source from the motor/generator 3 to the engine 1, similarly, shock due to the vibration at the time of starting the engine 1 is prevented from being transmitted beyond the torque converter 2 by starting the engine 1 when the lock-up clutch 11 is in the OFF (disengaged) state.

Figure 9:
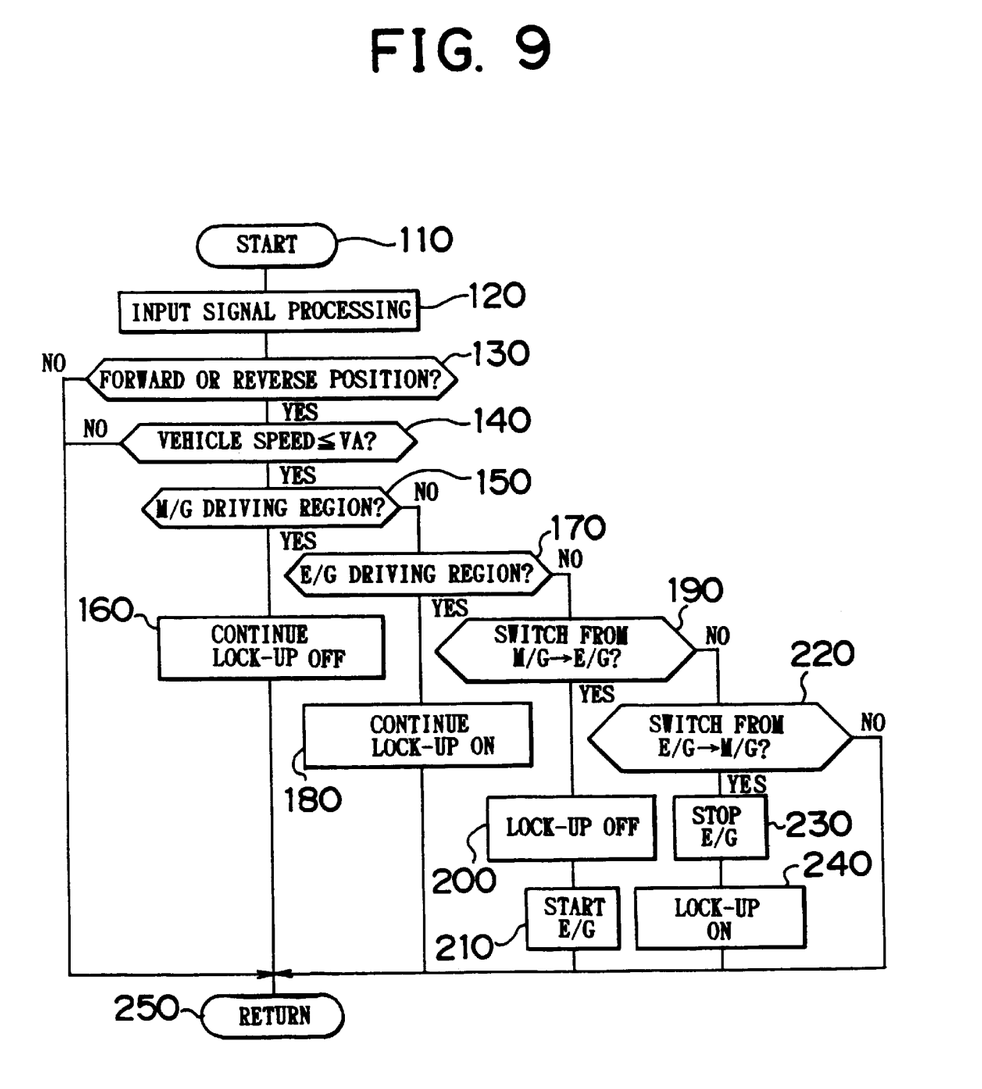
FIG. 9 is a flowchart that corresponds to claims 2 and 3.

Next, control corresponding to claims 2 and 3 will be described with reference to the flowchart of FIG. 9.

First, in step 120, input processing of various detection signals is performed. Next, in step 130, it is determined whether the shift lever 4C is set in a forward position or a reverse position, in other words, any position other than P or N, such as D, 4,3, 2, L or R.

If "NO" is determined in step 130, a speed change of the gear transmission mechanism (automatic transmission) will not be performed while the vehicle is running, and control of the lock-up clutch 11 will also not be performed. Therefore, control jumps to step 250 and RETURNs.

When "YES" is determined in step 130, control proceeds to step 140, where it is determined whether the vehicle speed is less than a predetermined specified value Va. This evaluation is provided because the time when switching of the drive source is a problem is directly after starting to move forward. In other words, the assumed condition is that, during driving by the motor/generator, the lock-up clutch 11 is engaged when the vehicle is stopped before starting to move forward, and that, during driving by the engine 1, the lock-up clutch 11 is disengaged when the vehicle is stopped prior to moving forward.

When "YES" is determined in step 140, control proceeds to step 150 and determines whether the vehicle is in the motor/generator driving region. If "YES" is determined in step 150, control proceeds to step 160 and continues the ON state of the lock-up clutch 11. On the other hand, if "NO" is determined in step 150, control proceeds to step 170 and determines whether the vehicle is in the engine 1 driving region. If "YES" is determined in step 170, control continues to step 180 and continues the OFF (disengaged) state of the lock-up clutch 11.

If "NO" is determined in step 170, control proceeds to step 190 and determines whether the drive source is to be switched from the motor/generator 3 to the engine 1. If "YES" is determined in step 190, in other words, if the drive source is to be switched from the motor/generator 3 to the engine 1, control proceeds to step 200. In step 200, the lock-up clutch 11, which is in the ON (engaged) state, is placed in the OFF (disengaged) state, after which control proceeds to step 210, performs starting of the engine, and then RETURNs. Therefore, the engine is started after the lock-up clutch 11 is placed in the OFF (disengaged) state, so the shock due to the changing of the torque at the time of starting the engine 1 is not transmitted to the elements on the other side of the torque converter 2.

Meanwhile, if "YES" is determined in step 190, control proceeds to step 220 and determines whether the drive source is to be switched from the engine 1 to the motor/generator 3. If "YES" is determined in step 220, in other words, if it is determined that the drive source is to be switched from the engine 1 to the motor/generator 3, control proceeds to step 230, where the lock-up clutch 11 is placed in the OFF (disengaged) state. Therefore, the drive source is switched to the motor/generator, after which the lock-up clutch 11 is placed in the ON (engaged) state. Control then RETURNs. Therefore, since the engine 1 is stopped while the lock-up clutch 11 is in the OFF (disengaged) state, the shock due to the change of torque during stopping of the engine 1 is not transmitted to the elements on the other side of the torque converter 2.

If "NO" is determined in step 220, control RETURNs without doing anything further.

Figure 10:
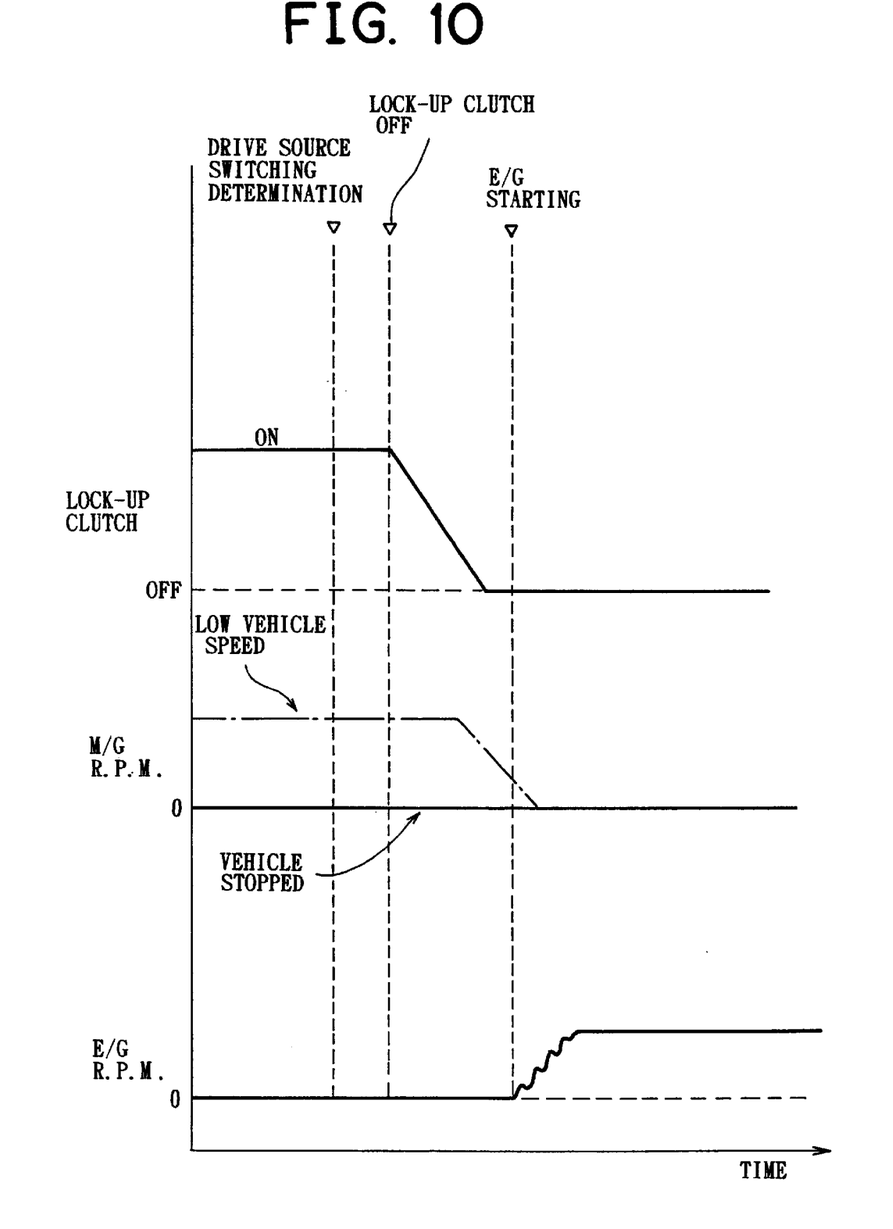
FIG. 10 is a timing chart that explains the control of FIG. 9.

FIG. 10 is a timing chart that shows the changes that occur when the above-described steps 190 through 210 are implemented. The point where the engine 1 is started after the lock-up clutch 11 is placed in the OFF (disengaged) state is clearly shown.

Figure 11:
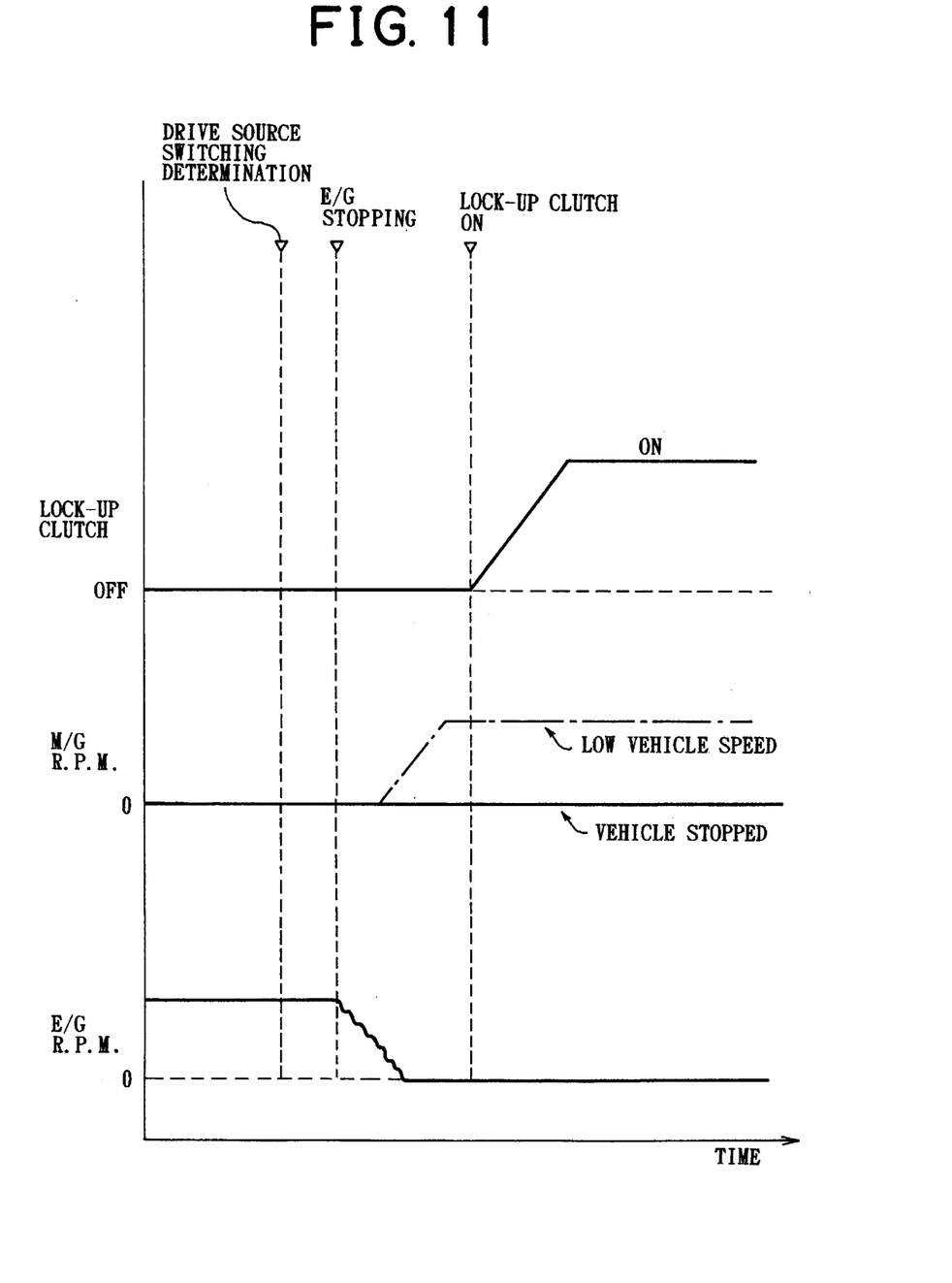
FIG. 11 is a timing chart that explains the control of FIG. 9.

FIG. 11 is a timing chart that shows the changes that occur when the above-describes 220–240 are implemented. The point where the lock-up clutch 11 is placed in the ON (engaged) state after the engine 1 is stopped, in other words, the point where stopping of the engine 1 is performed while the lock-up clutch 11 is in the OFF (disengaged) state, is clearly shown.

According to the invention of claim 1, when the drive source of a vehicle is switched between an engine and a motor/generator, a lock-up clutch that is engaged is temporarily disengaged, or placed in a half-engaged state, and the torque change at the time of switching the drive source is prevented from being transmitted to the output.

According to the invention of claim 2, when the drive source is switched from the motor/generator to the engine while the vehicle is stopped, switching is implemented after disengaging the lock-up clutch, and the shock due to the torque change at the time of starting the engine is prevented from being transmitted to the output.

According to the invention of claim 3, when the drive source switched from the engine to the motor/generator while a vehicle is stopped, switching is implemented after disengaging the lock-up clutch, and the shock due to the torque change at the time of stopping the engine during switching is prevented from being transmitted to the output.

What is claimed is:

1. A control system for a vehicle in which a fuel combustion-driven engine and a motor/generator are provided as interchangeable drive sources, and in which a transmission with a lock-up clutch is provided which is directly couplable between the drive sources and a drive wheel;

wherein, when the drive source is switched between the engine and the motor/generator, the engaged lock-up clutch is temporarily placed in a disengaged state or a half-engaged state.

2. A control system for a vehicle in which a fuel combustion-driven engine and a motor/generator are provided as interchangeable drive sources, and in which a transmission with a lock-up clutch is provided which is directly couplable between the drive sources and a drive wheel;

wherein, when the drive source is switched from the motor/generator to the engine while the vehicle is running at a speed that is lower than a predetermined speed, switching is performed after disengaging the lock-up clutch.

3. A control system for a vehicle in which a fuel combustion-driven engine and a motor/generator are provided as interchangeable drive sources, and in which a transmission with a lock-up clutch is provided which is directly couplable between the drive sources and a drive wheel;

wherein, when the drive source is switched from the engine to the motor/generator while the vehicle is running at a speed that is lower than a predetermined speed, switching is performed after the lock-up clutch is disengaged.

4. The control system of claim 1, wherein the vehicle further includes a fluid coupling that is arranged in parallel with the lock-up clutch.

5. The control system of claim 4, wherein the motor/generator is located between the engine and the fluid coupling.

6. The control system of claim 4, wherein the motor/generator is located between the engine and the transmission and the fluid coupling is located between the motor/generator and the transmission.

7. The control system of claim 1, wherein the transmission has a plurality of gear positions corresponding to a plurality of change gear ratios.

8. The control system of claim 1, wherein the lock-up clutch is temporarily placed in the disengaged state or the half-engaged state when the drive source is switched between the engine and the motor/generator while a shift lever is in a forward drive position.

9. The control system of claim 2, wherein the vehicle further includes a fluid coupling that is arranged in parallel with the lock-up clutch.

10. The control system of claim 9, wherein the motor/generator is located between the engine and the fluid coupling.

11. The control system of claim 9, wherein the motor/generator is located between the engine and the transmission and the fluid coupling is located between the motor/generator and the transmission.

12. The control system of claim 2, wherein the transmission has a plurality of gear positions corresponding to a plurality of change gear ratios.

13. The control system of claim 3, wherein the vehicle further includes a fluid coupling that is arranged in parallel with the lock-up clutch.

14. The control system of claim 13, wherein the motor/generator is located between the engine and the fluid coupling.

15. The control system of claim 13, wherein the motor/generator is located between the engine and the transmission and the fluid coupling is located between the motor/generator and the transmission.

16. The control system of claim 3, wherein the transmission has a plurality of gear positions corresponding to a plurality of change gear ratios.

17. A control system for a vehicle in which a fuel combustion-driven engine and a motor are provided as interchangeable drive sources, and in which a transmission with a lock-up clutch is provided which is directly couplable between the drive sources and a drive wheel;

wherein, when the drive source is switched between the engine and the motor, the engaged lock-up clutch is temporarily placed in a disengaged state or a half-engaged state.

18. A control system for a vehicle in which a fuel combustion-driven engine and a motor are provided as interchangeable drive sources, and in which a transmission with a lock-up clutch is provided which is directly couplable between the drive sources and a drive wheel;

wherein, when the drive source is switched from the motor to the engine while the vehicle is running at a speed that is lower than a predetermined speed, switching is performed after disengaging the lock-up clutch.

19. A control system for a vehicle in which a fuel combustion-driven engine and a motor are provided as interchangeable drive sources, and in which a transmission with a lock-up clutch is provided which is directly couplable between the drive sources and a drive wheel;

wherein, when the drive source is switched from the engine to the motor while the vehicle is running at a speed that is lower than a predetermined speed, switching is performed after the lock-up clutch is disengaged.

20. The control system of claim 17, wherein the vehicle further includes a fluid coupling that is arranged in parallel with the lock-up clutch.

21. The control system of claim 20, wherein the motor is located between the engine and the fluid coupling.

22. The control system of claim 20, wherein the motor is located between the engine and the transmission and the fluid coupling is located between the motor and the transmission.

23. The control system of claim 17, wherein the transmission has a plurality of gear positions corresponding to a plurality of change gear ratios.

24. The control system of claim 17, wherein the lock-up clutch is temporarily placed in the disengaged state or the half-engaged state when the drive source is switched between the engine and the motor while a shift lever is in a forward drive position.

25. The control system of claim 18, wherein the vehicle further includes a fluid coupling that is arranged in parallel with the lock-up clutch.

26. The control system of claim 25, wherein the motor is located between the engine and the fluid coupling.

27. The control system of claim 25, wherein the motor is located between the engine and the transmission and the fluid coupling is located between the motor and the transmission.

28. The control system of claim 18, wherein the transmission has a plurality of gear positions corresponding to a plurality of change gear ratios.

29. The control system of claim 19, wherein the vehicle further includes a fluid coupling that is arranged in parallel with the lock-up clutch.

30. The control system of claim 29, wherein the motor is located between the engine and the fluid coupling.

31. The control system of claim 29, wherein the motor is located between the engine and the transmission and the fluid coupling is located between the motor and the transmission.

32. The control system of claim 19, wherein the transmission has a plurality of gear positions corresponding to a plurality of change gear ratios.

* * * * *